Nov. 12, 1968  L. G. ROESS ET AL  3,410,177
APPARATUS FOR PROVIDING A COMMAND SIGNAL FOR A SERVOACTUATOR
Filed June 20, 1966  3 Sheets-Sheet 2

INVENTORS
Louis G. Roess
Patrick M. Dark
BY
Popp and Sommer
ATTORNEYS

Nov. 12, 1968   L. G. ROESS ET AL   3,410,177
APPARATUS FOR PROVIDING A COMMAND SIGNAL FOR A SERVOACTUATOR
Filed June 20, 1966   3 Sheets-Sheet 3

INVENTORS
Louis G. Roess
Patrick M. Dark
BY
Popp and Sommer
ATTORNEYS

United States Patent Office 3,410,177
Patented Nov. 12, 1968

3,410,177
APPARATUS FOR PROVIDING A COMMAND
SIGNAL FOR A SERVOACTUATOR
Louis G. Roess and Patrick M. Dark, East Aurora, N.Y.,
assignors to Moog Inc., East Aurora, N.Y., a corporation of New York
Filed June 20, 1966, Ser. No. 558,649
7 Claims. (Cl. 91—361)

ABSTRACT OF THE DISCLOSURE

Apparatus for deriving a command signal for a servoactuator to move a member, which includes manually settable multiple position switches associated with predetermined incremental voltage sources to develop discrete voltages which are summed to provide a command signal fed to a summing point in a circuit associated with the servoactuator, and transducer means responsive to the output of the member being arranged to transmit a feedback signal to the summing point.

This invention pertains to improvements in apparatus for providing a command signal for a servoactuator.

While the invention will be illustrated and described in connection with a single-spindle chucking machine, it is not intended to limit the application of the invention only to such a machine. Rather the invention is intended for all applications to which it is suited and is limited in scope only as defined in the appended claims.

As applied to a single-spindle chucking machine, the invention provides outstanding advantages and improvements over such a machine as constructed and operated prior to the advent of the present invention. A conventional chucking machine of the type being considered includes a spindle rotatable about a horizontal axis and having a chuck adapted to hold the workpiece, a pair of cross slides severally arranged on opposite sides of the spindle axis and movable generally transversely thereof, and a turret slide movable longitudinally of the spindle. Each of these slides is adapted to hold a tool, the turret slide holding a plurality of tools, so that these tools may be moved toward the workpiece and into contact therewith for performing a machining operation thereon in the desired sequence and to the desired extent. Inasmuch as different workpieces require different machining operations to be performed on them, not only as to the sequence of the operations but also the extent to which the slides carrying the tools are moved to produce the dimensions desired on the workpiece, it was heretofore required to expend an extensive amount of time in setting up mechanical trains including cams, dogs, gears and limit switches to adapt the mechanisms for controlling the movement of the tool slides.

The present invention as aplied to such a single spindle chucking machine has for its primary purpose and possesses as its outstanding advantage the feature of greatly reducing the set up time for the machine.

Ancillary to this are the advantages of the illustrative application of the invention that the movement of the tool slides is smooth which improves tool life, and that optimum operation is achieved during actual machining easily.

In accordance with the present invention a movable member, which may be a tool slide in the example illustrated, is moved by a servoactuator which responds to electrical intelligence in the form of an electrical command signal derived by novel means. This signal may command a velocity, i.e. a feed, or a position for the member.

A general object of the invention is to provide means for deriving a readily and easily selectively variable, electrical command signal for the servoactuator.

Another general object is to provide such command signal deriving means which is reliable as to accuracy and repeatability under varying environmental conditions and over long periods of time.

Another general object is to provide means for transferring from feed to position intelligence which accomplishes the transfer without causing undesired variations in the quality of the intelligence.

Other objects and advantages of the invention will be apparent from the following detailed description of preferred embodiments as applied illustratively to a single-spindle chucking machine, taken in conjunction with the accompanying drawings wherein.

Figure 1:
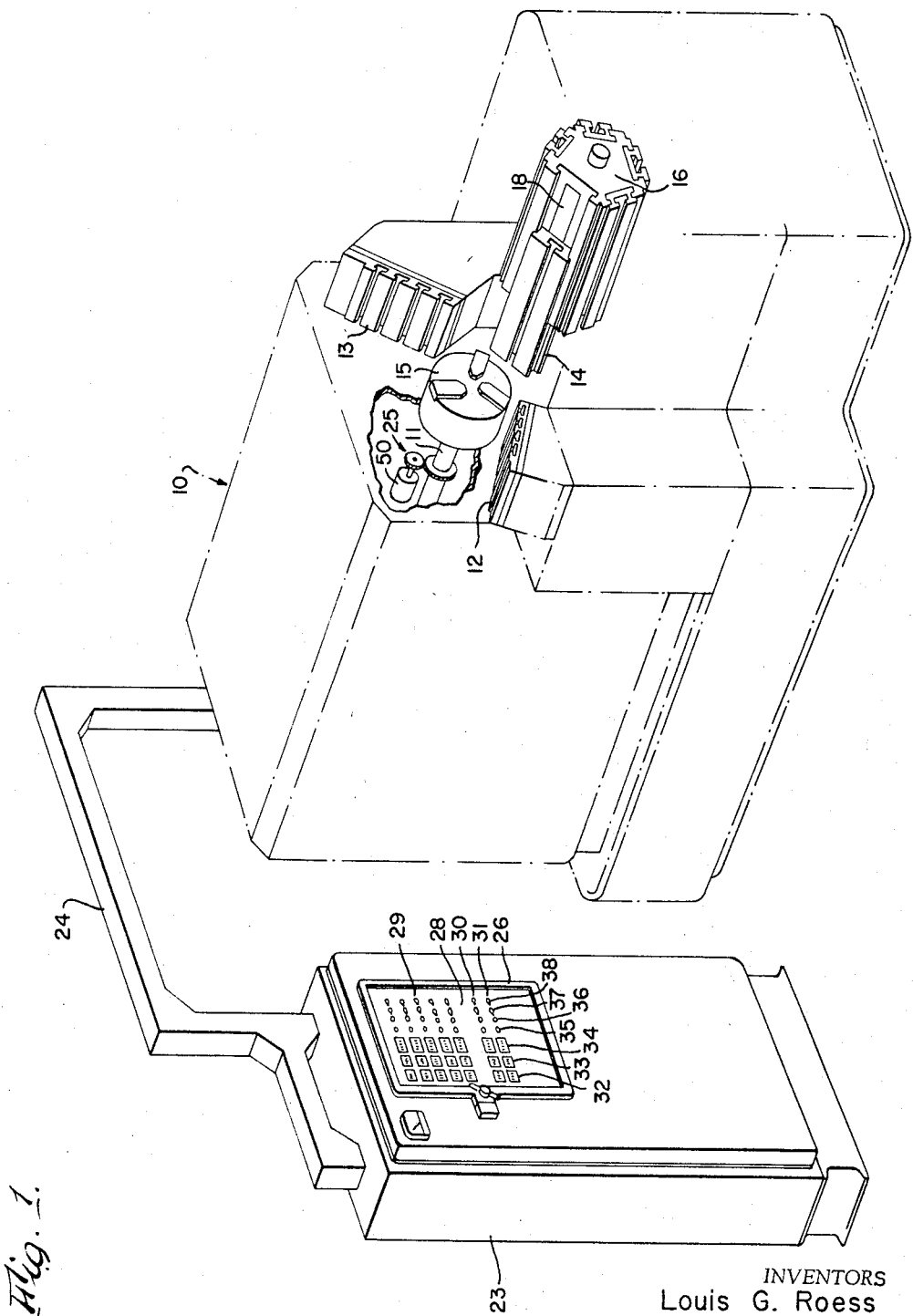
FIG. 1 is a perspective view, somewhat schematic, of a single-spindle chucking machine to which the present invention has been applied for illustrative purposes, portions of the machine being broken away to reveal hidden structure.

Referring to FIG. 1, the numeral 10 represents generally a single-spindle chucking machine shown as having a spindle 11, a front cross slide 12, a rear cross slide 13, and a turret slide 14. Spindle 11 is arranged for rotation about a horizontal axis and at one end carries a chuck 15 of any suitable type and construction adapted to hold releasably a workpiece (not shown). Cross slides 12 and 13 are arranged for rectilinear movement generally transversely of the spindle axis. Turret slide 14 is arranged for rectilinear movement axially of spindle 12. Each of slides 12–14 is adapted to hold a tool (not shown) for performing the desired machining operation on the workpiece, such as cutting, drilling or tapping. In the case of turret slide 14, this is one of a plurality of similiar slides mounted on a turret head 16 rotatable about a horizontal axis extending parallel to the spindle axis so that these slides may individually hold different tools. The rotative operation of turret head 16 is not relevant to the present invention and hence its control mechanism is not illustrated.

Figure 4:
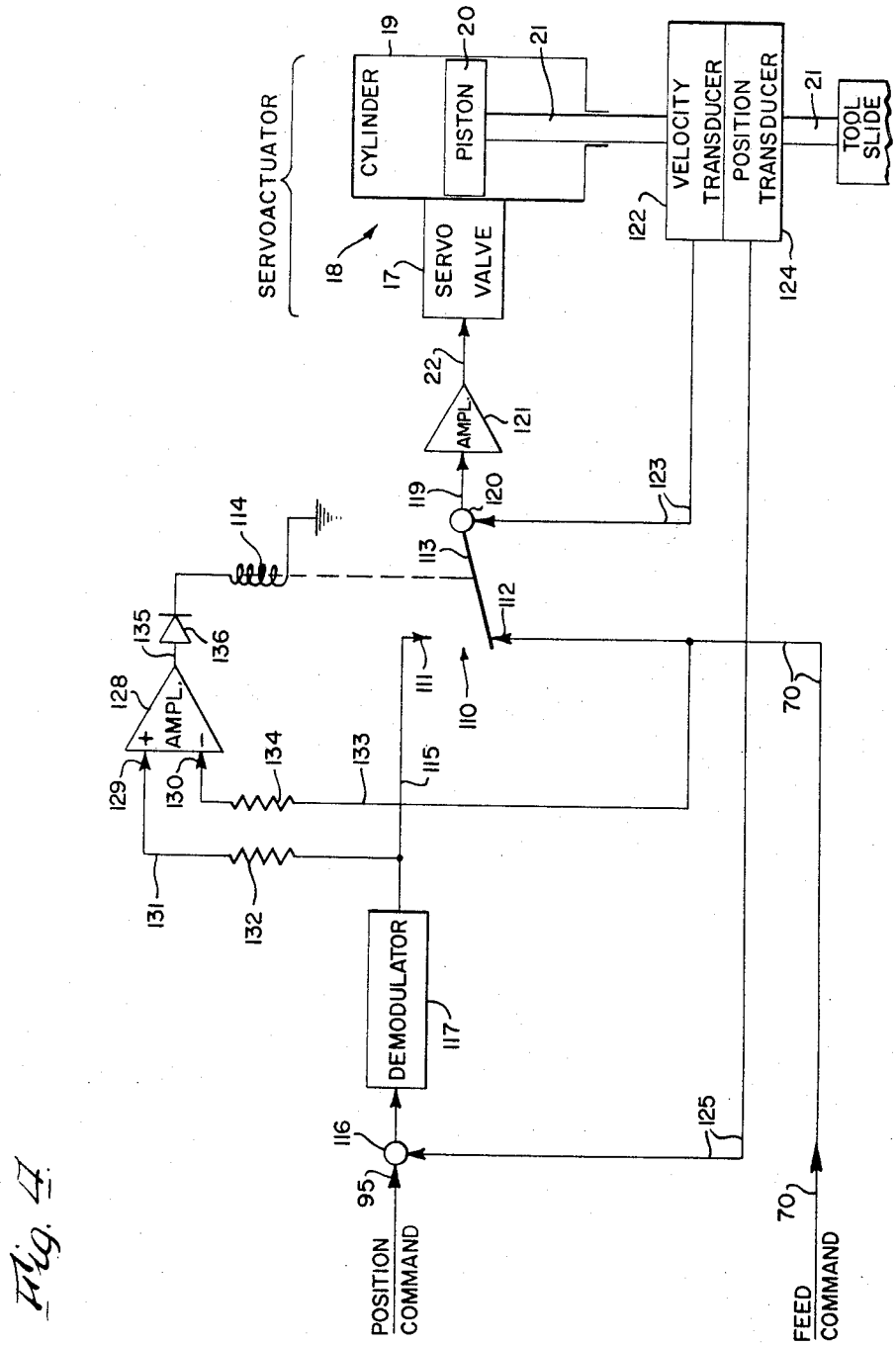
FIG. 4 is a wiring diagram of means for successively receiving feed and position command signals derived from the means shown in FIGS. 3 and 2, respectively.

In accordance with the present invention each of tool slides 12–14 is moved by a servoactuator of any suitable type which responds to electrical intelligence. A preferred type of such servoactuator is schematically depicted in FIG. 4, represented generally by the numeral 18 and is intended as typical for each of tool slides 12–14. Servoactuator 18 is shown as including a cylinder 19 in which a piston 20 mounted on one end of a rod 21 is slidably arranged, and an electrohydraulic servovalve 17 for controlling the flow of fluid with respect to the cylinder chambers on opposite sides of piston 20. Servovalve 21 may be of any suitable specific construction so long as it produces flow control proportional to the magnitude and sense of an electrical error signal supplied through an input circuit represented by line 22.

Adverting again to FIG. 1, the numeral 23 represents generally a control console standing separate from machine 10 and connected thereto through an overhead wiring duct 24 which is shown as leading from the top of the console to the end of the machine 23 remote from turret head 16. Console 23 is shown as having a transparent door 26 on its front side to provide access to a program panel 28 on which various manually settable controls are arranged. These controls, only schematically suggested in FIG. 1, are shown as arranged in horizontal rows. Thus, the top five control rows 29 are severally for the five positions of turret head 16, one of which rows would control the movement of turret slide 14 for example. The next lower control row 30 is for controlling the movement of front cross slide 12. The next lower control row 31 is for controlling the movement of rear cross slide 13. There may be addition control rows for functions, if desired, but since these form no part of the present invention none is illustrated.

Using row 31 as representative of all of rows 29–31, this row is shown as having, reading from left to right, a feed control 32, a feed start position control 33, a feed final position control 34, a final position vernier control 35, a feed dwell control 36, a spindle speed control 37, and a function control 38. Each of controls 32–38 is manually settable and therefore selective. The present invention will be illustrated in connection with feed control 32 and feed final position control 34.

As used herein, feed is a command for the servoactuator 18 to move a member, such as one of tool slides 12–14, at a velocity having a selective finite ratio to the velocity of another member, such as spindle 11. In the illustration being presented, manually settable feed control 32 is a part of means for selectively determining the feed command signal and comprises a plurality of decade switches, a commercially available item having ten fixed contacts and one movable selector contact or wiper engageable with any one of the ten contacts. Inasmuch as the feed will be expressed as a distance for the tool slide to be moved for each revolution of the spindle, preferably using an inch as the unit of distance measurement and keeping in mind as a practical matter that a cutting tool is not likely to move relative to a workpiece more than one inch per revolution, the feed is selected as a decimal part to three places of an inch per revolution of the spindle.

Figure 3:
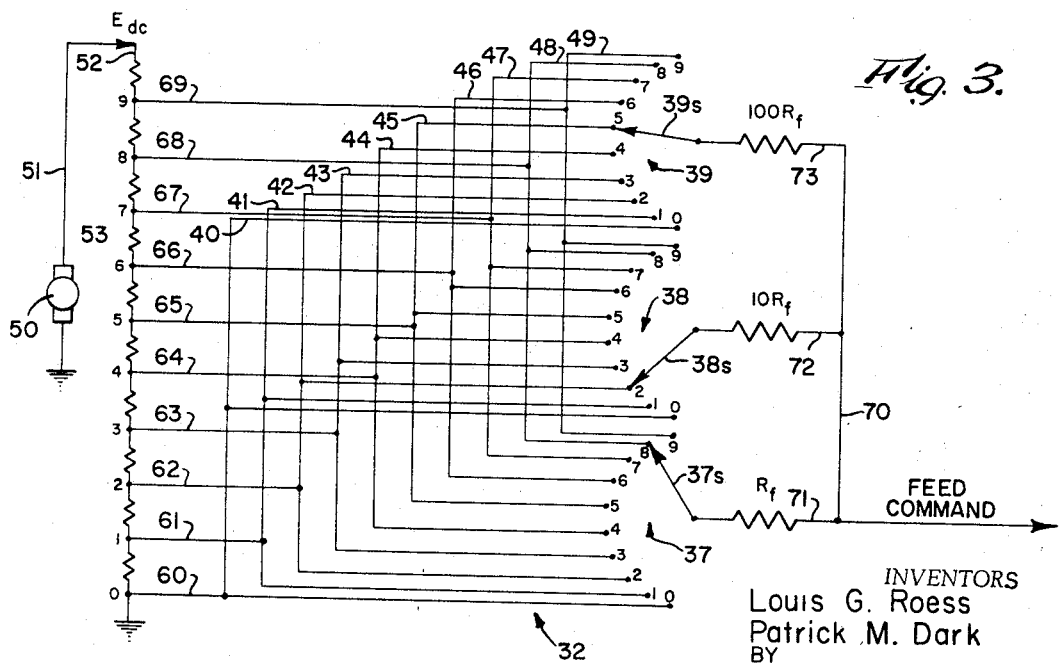
FIG. 3 is a wiring diagram of means for deriving a feed command signal for such servoactuator.

The means for deriving such a feed command signal are diagrammatically illustrated in FIG. 3, wherein feed control 32 is depicted as three manually settable decade switches 37, 38 and 39 each of which has ten fixed contacts, severally numbered 0 to 9 successively, and a selector contact designated 37s, 38s and 39s, respectively. All of the correspondingly numbered fixed contacts are connected together by conductors or lines 40–49, respectively.

Any suitable means may be employed for providing a ten-stage voltage gradient having ten connections at equal voltage drop increments including means for generating the voltage applied across the gradient proportional to the velocity of spindle 11. As preferred and illustrated, a tachometer 50 driven by spindle 11, through suitable gearing 25 shown in FIG. 1, provides a convenient means of providing a direct current voltage $E_{dc}$ applied via output conductor or line 51 to one end of a gradient conductor or line 52. The other end of this line 52 is shown connected to ground, as is also tachometer 50. Ten similar resistors, each represented by the numeral 53, are shown as arranged in series in gradient 52 which is also shown as having ten intermediate connections, represented by the numerals 0 to 9.

These connections 0 to 9 are shown as connected to lines 40–49 severally by conductors or lines 60–69, respectively. In this manner lines 60–69 and 40–49 provide circuit means connecting each of connections 0 to 9 in gradient line 52 to the corresponding ones of the fixed contacts 0 to 9 of switches 37–39.

Parallel summing circuit means are provided and shown as including a summing line 70, branch lines 71–73 severally for the switches 37–39, respectively, and a resistor in each such branch line. Branch line 71 has resistor $R_f$ therein and connects selector contact 37s to line 70; branch line 72 has resistor $10R_f$ therein and connects selector contact 38s to line 70; and branch line 73 has resistor $100R_f$ therein and connects selector contact 39s to line 70. Thus all branch lines 71–73 connect their respective selector contact in parallel to the summing line 70. It is pointed out that the ohmic values of the various resistors in branch lines 71–73 is such that the value of resistor $10R_f$ is ten times that of resistor $R_f$, and the value of resistor $100R_f$ is one hundred times that of resistor $R_f$.

For example, if ten volts are impressed across voltage gradient line 52 as the output of tachometer 50, the voltage will drop in equal one volt increments successively across resistors 53 so that line 69 carries nine volts, line 68 eight volts, and so on, with line 60 carrying zero volt. Each of the selector contacts of switches 37–39 can connect to any level of the voltage gradient, zero through nine volts in the example being given, but because the resistors $R_f$, $10R_f$ and $100R_f$ vary by a factor of ten the outputs of branch lines 71–73 will be in tenths, hundredths and thousandths of the selected voltage level. Thus branch line 71 can have an output from .0 to .9 volt, branch line 72 from .00 to .09 volt, and branch line 73 from .000 to .009 volt. Line 70 sums these outputs so that it can transmit a feed command signal in the range of from .0 to .999 volt, any specific value of which is selected by manually setting selector contacts 37s, 38s and 39s. As shown in FIG. 3, the feed command signal is set for .826 volt, this representing a feed or movement of the associated tool slide as a predetermined number of inches per revolution of the spindle 11. Regardless of any variation in the rotational velocity of spindle 11 the velocity of the associated tool slide will remain proportional for the selected feed command.

As used herein, position is a command for the servoactuator 18 to move a member, such as one of tool slides 12–14, to a predetermined position. In the illustration being presented, manually settable feed final position control 34 is a part of means for selectively determining the feed final position command signal and comprises a plurality of decade switches, similar to those previously considered. Position is a distance, preferably measured in inches, and can be selected as a dimension including units and a decimal part of a unit to three places.

Figure 2:
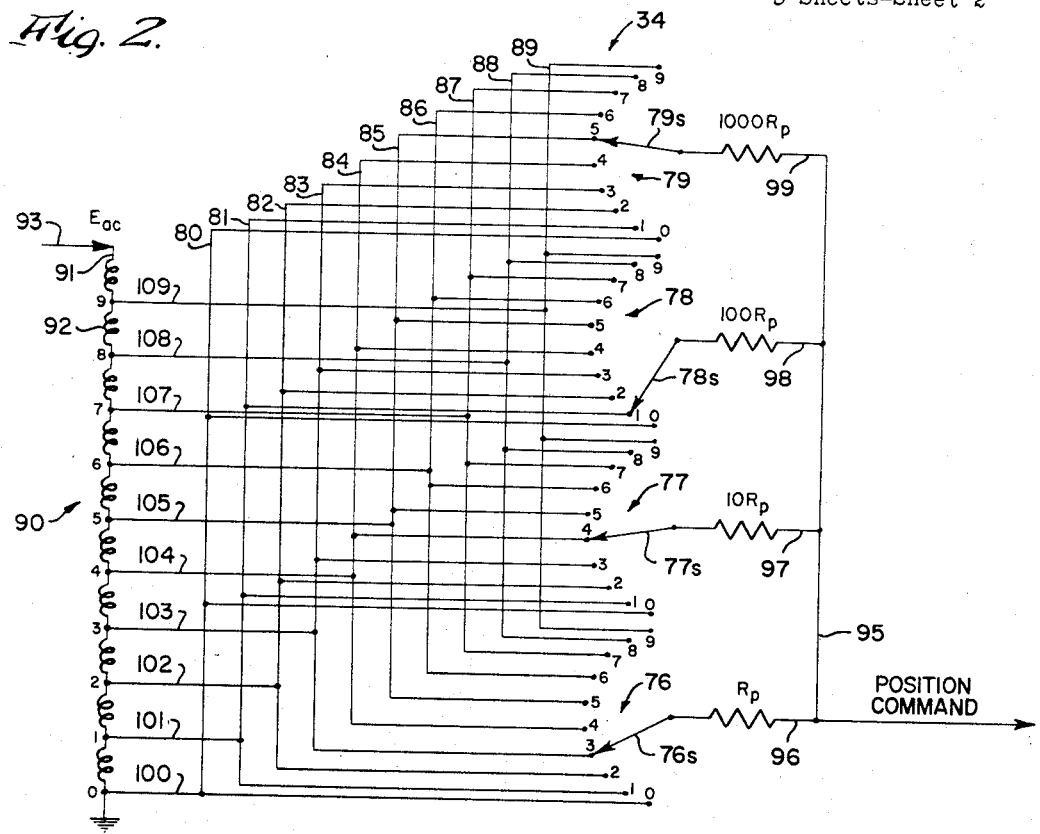
FIG. 2 is a wiring diagram of the means for deriving a position command signal for a servoactuator for moving one of the tool slides shown in FIG. 1.

The means for deriving such a position command signal, specifically a feed final position command signal, are diagrammatically illustrated in FIG. 2 wherein feed final position control 34 is depicted as four manually settable decade switches 76–79 each of which has ten fixed contacts, severally numbered 0 to 9 successively, and a selector contact designated 76s, 77s, 78s and 79s, respectively. All of the correspondingly numbered fixed contacts are connected together by conductors or lines 80–89, respectively.

While any suitable means may be employed for providing a ten-stage voltage gradient having ten connections at equal voltage drop increments, it is preferred to impress an alternating current voltage $E_{ac}$ across a reference transformer represented generally by the numeral 90. This transformer is shown as including a gradient conductor or line 91 having in series therein ten similar coils 92 and ten intermediate connections or taps represented by the numerals 0 to 9. Voltage $E_{ac}$ is applied via conductor or line 93 to one end of gradient line 91 the other end of which is shown as connected to ground. The connections or taps 0 to 9 are shown as connected to lines 80–89 severally by conductors or lines 100–109, respectively. In this manner lines 100–109 and 80–89 provide circuit means connecting each of transformer taps 0 to 9 in gradient line 91 to the corresponding ones of the fixed contacts 0 to 9 of switches 76–79.

Parallel summing circuit means are provided and shown as including a summing line 95, branch lines 96–99 severally for the switches 76–79, respectively, and a resistor in each such branch line. Branch line 96 has resistor $R_p$ therein and connects selector contact 76s to line 95; branch line 97 has resistor $10R_p$ therein and connects selector contact 77s to line 95; branch line 98 has resistor $100R_p$ therein and connects selector contact 78s to line 95; and branch line 99 has resistor $1000R_p$ therein and connects selector contact 79s to line 95. Thus all branch lines 96–99 connect their respective selector contact in parallel to the summing line 95. It is pointed out that the ohmic values of the various resistors in branch lines 96–99 is such that the value of resistor $10R_p$ is ten times that of resistor $R_p$, the value of resistor $100R_p$ is one hundred times that of resistor $R_p$, and the value of resistor $1000R_p$ is one thousand times that of resistor $R_p$.

For example, if ten volts as $E_{ac}$ are impressed across voltage gradient line 91, the voltage will drop in equal one volt increments successively across coils 92 so that line 109 carries nine volts, line 108 eight volts, and so on, with line 100 carrying zero volt. Each of the selector contacts of switches 76–79 can connect to any level of the voltage gradient, zero through nine volts in the example being given, but because the resistors $R_p$, $10R_p$, $100R_p$ and $1000R_p$ vary by a factor of ten the outputs of branch lines 96–99 will be in units, tenths, hundredths and thousandths of the selected voltage level. Thus branch line 96 can have an output from 0 to 9 volts, branch line 97 from .0 to .9 volt, branch line 98 from .00 to .09 volt, and branch line 99 from .000 to .009 volt. Line 95 collects these outputs and transmits the sum as a position command signal in the range of from 0 to 9.999 volts, any specific value of which is selected by manually setting selector contacts 76s, 77s, 78s and 79s. As shown in FIG. 2, the position command signal is set for 3.415 volts, this representing a position of the associated tool slide as a predetermined number of inches.

Referring to FIG. 4, relay means represented generally by the numeral 110 are shown as including first and second fixed contacts 111 and 112, a third and movable contact or armature 113, and a coil 114. A conductor line 115 connects position command signal input line 95 to contact 111 and is shown as including in series a summing point 116 and suitable demodulating means 117 for converting the position command signal from an AC to a DC signal. Feed command line 70 is shown as leading and being connected to contact 112. A conductor or line 119 connects movable contact 113 to servoactuator input line 22 and is shown as including in series a summing point 120 and suitable amplifier means 121.

Suitable linear velocity transducer means 122 are shown as operatively associated with piston rod 21 of servoactuator 18 and arranged to transmit a feedback signal via a feedback conductor or line 123 to summing point 120. This transducer 122 generates a feedback signal responsive to the linear velocity of piston rod 21 and hence the tool slide associated therewith. When relay 110 is deenergized so that its movable contact 113 engages fixed contact 112, as illustrated in FIG. 4, the elements 120, 119, 121, 22, 18, 122 and 123 provide a closed loop so that when receiving a feed command signal via input line 70 the servoactuator 18 is operated in a closed loop velocity mode. The velocity error signal transmitted via line 119 is the algebraic sum of the feed command signal put in the velocity closed loop via input line 70, and the velocity feedback signal fed back via feedback line 123.

Suitable position transducer means 124 are also shown as operatively associated with piston rod 21 of servoactuator 18 and arranged to transmit a feedback signal via a feedback conductor or line 125 to summing point 116. This transducer 124 generates a feedback signal responsive to the position of piston rod 21 and hence the tool slide associated therewith. When movable relay contact 113 engages fixed contact 111, as not illustrated in FIG. 4, the elements 116, 115, 117, 111, 113, 119, 121, 22, 18, 124 and 125 provide a closed loop so that when receiving a position command signal via input line 95 the servoactuator 18 is operated in a closed loop positioning mode. The position error signal transmitted via line 115 is the algebraic sum of the position command signal put in the position closed loop via input line 95 and the position feedback signal fed back via feedback line 125.

Suitable means are provided for holding movable relay contact 113 in engagement with fixed relay contact 112 so long as the weighted value of the position error signal in line 115 exceeds the velocity or feed command signal in line 70 and is arranged to actuate relay 110 for moving contact 113 into engagement with the other fixed relay contact 111 when the aforesaid weighted value of the position error signal becomes equal to or less than the velocity command signal, whereby operation of servoactuator 18 is transferred from a closed loop velocity mode to a closed loop positioning mode.

While such means may be variously constructed they are shown in FIG. 4 as comprising suitable operational amplifier means 128 having a plus input terminal 129 and a minus input terminal 130. A branch conductor or line 131 having a resistor 132 therein is shown as connecting position error signal line 115 to terminal 129, while another branch conductor or line 133 having a resistor 134 therein connects feed command signal line 70 to terminal 130. An output conductor or line 135 having a rectifier 136 therein of any suitable type such as a diode is shown as connecting amplifier 128 to one end of relay coil 114, the other end thereof being connected to ground. The ratio of the resistors 132 and 134 one to another provides the appropriate weight to the position error signal received through branch line 131 in relation to and for comparison in amplifier 128 with the feed command signal received through branch line 133. Rectifier 136 operates to pass a current for energization of relay coil 114 only if the weighted value of the position error signal exceeds the value of the feed command signal. When relay 110 is thus energized its movable contact 113 moves from engagement with fixed contact 111, representing the deenergized condition of the relay, to engagement with the other fixed contact 112. It will be appreciated that while servoactuator 18 is operating in a closed loop velocity mode to move piston rod 21 the tool slide being moved thereby is approaching the preselected final position causing the position feedback signal to increase thereby reducing the magnitude of the position error signal in lines 115 and 131. When the weighted value of this position error signal drops to the level of the feed command signal, coil 114 is deenergized and relay 110 operated to transfer the operation of servoactuator from a closed loop velocity mode to a closed loop positioning mode. It is to be understood that the feed command signal deriving means establishes a voltage in summing line 70 which is so calibrated as to produce a tool slide feed expressed as that part of an inch of movement per revolution of spindle 11 corresponding to the particular setting of the dials in feed control 32. Likewise, the position command signal deriving means establishes a voltage in summing line 95 which is so calibrated as to produce a movement of the tool slide to a position expressed as a selected number of inches of travel corresponding to the particular setting of the dials in feed control 34.

Thus the amplifier 128, rectifier 136 and associated relay coil 114 provide a null detecetor for switching contact 113 alternately between contacts 112 and 111 under the conditions described, keeping in mind that contact 113 is biased as a practical matter, for example by spring means (not shown), toward the relay deenergized condition in which contact 111 is engaged. This switching between modes of operation is simply, economically and accurately achieved without drift.

Employing an alternating current voltage in the means for deriving a position command signal enables a transformer to be used to provide a stiff voltage whereby the effects of widely varying loads on the connections between the switch contacts is avoided. This allows the derivation of accurate position command signals within a small error tolerance. In the case of the means for deriving a feed command signal, a direct current voltage can be impressed across voltage gradient line 52 by loading the associated circuits inasmuch as a greater error can be tolerated in connection with feed command than with position command, and this avoids providing demodulating means if an alternating current voltage were used.

Each of the various decade switches 37–39 and 76–79 preferably is of the type wherein its selector contact is moved by a dial having ten stations on its periphery severally numbered to correspond to its 0 to 9 fixed contacts. The dials in a particular switch group, such as the three switches 37–39 constituting feed control 32 or the four switches 76–79 constituting feed final position control 34, are arranged adjacent one another with their edges exposed for manipulation and their numbered stations viewable.

OPERATION

Before machining operations are to commence, an operator manipulates the various controls 32–36 in control console 23 to provide the desired movements of the various tool slides 12–14. For purposes of illustrating the essence of the present invention as claimed, the operator dials in the feed command for the desired one of tool slides 12–14 in control 32 in the appropriate one of the rows 29–31 and also dials in the feed final position command for such slide in control 34 in the same row. This derives feed and position command signals by the circuitry shown in FIGS. 3 and 2, respectively. These signals are related through the circuitry shown in FIG. 4. Such derivation of the feed and position command signals enables means, not shown because forming no part of the present invention, to commence the cycle of operation after a workpiece is positioned in chuck 15. Feed will occur at the preseleted rate until the tool slide reaches the feed final position. Other means, again not shown because no part of the present invention, stop the tool slide and return it to its starting position.

A new workpiece can be substituted for the one just machined and the cycle repeated, or before starting machining operations new commands can be dialed in to perform a different machining cycle.

From the foregoing, it will be seen that the embodiment illustrated achieves the objects and advantages stated. And variations may occur to those skilled in the art without departing from the spirit of the invention.

What is claimed is:

1. In apparatus having a movable member moved by a servoactuator which responds to electrical intelligence, wherein the improvement comprises means for deriving a command signal for said servoactuator including means for providing a ten-stage voltage gradient having ten connections at equal voltage drop increments, a plurality of manually settable decade switch means each including a selector contact movable relative to and engageable with ten contacts, circuit means connecting each of said ten connections to the corresponding ones of said ten contacts, parallel summing circuit means including a summing line, a branch line for each of said switch means and connecting its said selector contact to said summing line and a resistor in each such branch line, the ohmic values of such various resistors varying by a factor of ten, additional circuit means associated with said summing line and leading to said servoactuator and including a summing point, and transduucer means responsive to the output of said member and arranged to transmit a feedback signal to said summing point.

2. The improvement as defined in claim 1 wherein said signal is a position command signal, and said transducer means is responsive to the position of said member.

3. The improvement as defined in claim 2 wherein said voltage gradient providing means is a transformer on which an alternating current voltage is impressed and said connections are ten taps on said transformer.

4. The improvement as defined in claim 1 wherein said signal is a feed command signal, and said transducer means is responsive to the velocity of said member.

5. In apparatus having a first movable member and a second movable member to be moved with respect to said first member by a servoactuator, wherein the improvement comprises means for deriving a feed command signal for said servoactuator to move said second member at a velocity having a selective finite ratio to the veloctiy of said first member including means for providing a ten-stage voltage gradient having ten connections at equal voltage drop increments and also including means for generating the voltage applied across said gradient proportional to the velocity of said first member, a plurality of manually settable decade switch means each including a selector contact movable relative to and engageable with ten contacts, circuit means connecting each of said ten connections to the corresponding ones of said ten contacts, and parallel summing circuit means including a summing line, a branch line for each of said switch means and connecting its said selector contact in parallel to said summing line and a resistor in each such branch line, the ohmic values of such various resistors varying by a factor of ten; additional circuit means associated with said summing line and leading to said servoactuator and including a summing point; and velocity transducer means responsive to the velocity of said second member and arranged to transmit a feedback signal to said summing point, whereby said second member is caused to move at a velocity proportional to the velocity of said first member for any selected feed command.

6. The improvement as defined in claim 5 wherein said first member is rotatively driven and said second member is translationally movable with respect to said first member, the feed command signal is to move said second member at a linear velocity having a selective finite ratio to the rotational velocity of said first member, and said generating means generates a voltage proportional to the rotational velocity of said first member, whereby said second member is caused to move at a linear velocity proportional to the rotational velocity of said first member for any selected feed command.

7. In apparatus having a movable member moved by a servoactuator from a first position to a second position at a predetermined velocity, means for producing a position error signal and means for producing a velocity command signal, wherein the improvement comprises means providing first and second contacts and a third contact movable alternately between said first and second contacts, said first contact being operatively associated with said position error signal, said second contact being operatively associated with said velocity command signal, said third contact being operatively associated with said servoactuator, and means for holding said third contact in engagement with said second contact so long as the weighted value of said position error signal exceeds said velocity command signal and also for moving said third contact to said first contact when said weighted value of said position error signal becomes equal to or less than said velocity command signal, whereby said servoactuator is operated either in a velocity mode or in a positioning mode.

References Cited

UNITED STATES PATENTS

| | | | |
|---|---|---|---|
| 1,308,089 | 7/1919 | Mardis et al. | 91—362 |
| 1,841,629 | 1/1932 | Pigeolet | 91—362 |
| 1,851,902 | 3/1932 | Haeghen | 91—362 |
| 2,738,504 | 3/1956 | Gray | 318—20.330 |
| 2,927,258 | 3/1960 | Lippel | 318—20.330 |

PAUL E. MASLOUSKY, *Primary Examiner.*